United States Patent [19]
Inokuchi et al.

[11] 4,134,135
[45] Jan. 9, 1979

[54] OPTOELECTRONIC SCANNING APPARATUS

[75] Inventors: Toshiyuki Inokuchi; Yoshiaki Kanmoto, both of Tokyo, Japan

[73] Assignee: Ricoh Company, Ltd., Tokyo, Japan

[21] Appl. No.: 823,695

[22] Filed: Aug. 11, 1977

[30] Foreign Application Priority Data

Aug. 18, 1976 [JP] Japan .................... 51/98316

[51] Int. Cl.² .............................................. H04N 1/02
[52] U.S. Cl. ................................. 358/280; 358/293; 358/294
[58] Field of Search ................ 358/280, 285, 293, 294

[56] References Cited
U.S. PATENT DOCUMENTS

| 2,311,803 | 2/1943 | Wise | 358/293 |
| 4,007,362 | 2/1977 | Sindermann | 358/280 |
| 4,025,957 | 5/1977 | Wada | 360/48 |
| 4,037,231 | 7/1977 | Broyles | 358/293 |
| 4,044,384 | 8/1977 | Inokuchi | 358/293 |
| 4,081,843 | 3/1978 | Okano | 358/293 |

*Primary Examiner*—Howard W. Britton
*Attorney, Agent, or Firm*—David G. Alexander

[57] ABSTRACT

An optical system scans an original document vertically and focusses an image of a linear portion of the document onto a photosensor array which comprises a large number of photosensor elements arranged in a line. The photosensor elements are sequentially enabled always in one direction to effect horizontal scan of the linear portion of the document. The optical system alternately scans up and down to maximize the vertical scanning speed. Reversal means control the optical system and photosensor array to effect rightward and leftward horizontal scan when the vertical scan direction is upward and downward respectively. The optical system may comprise two imaging systems to project erect and inverted images on the photosensor array respectively, the reversal means comprising a shutter for selectively unblocking the imaging systems. Alternatively, the output signals of the photosensor elements may be stored in a bi-directional shift register or a random access memory with a bi-directional address counter, and read out in a direction corresponding to the direction of vertical scan.

5 Claims, 13 Drawing Figures

Fig. 6
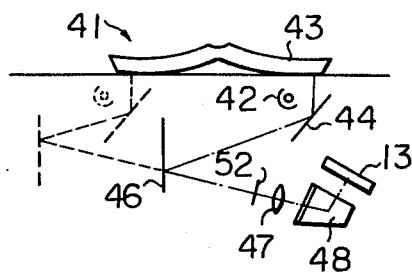
Fig. 7
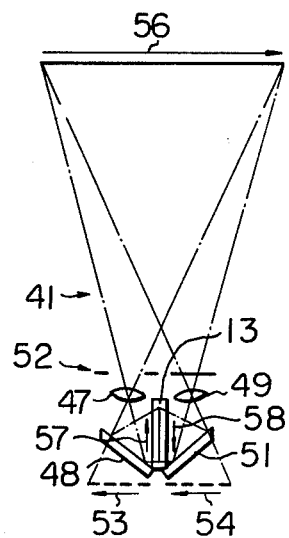
Fig. 8       Fig. 9       Fig. 10
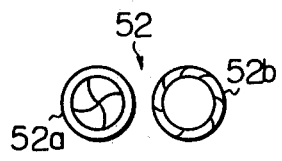 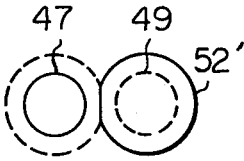 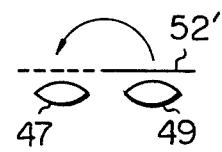

OPTOELECTRONIC SCANNING APPARATUS

BACKGROUND OF THE INVENTION

The present invention relates to an optoelectronic scanning apparatus which may be advantageously incorporated into a facsimile reader or the like.

Photosensor arrays of various types have been recently developed which greatly facilitate the design of optoelectronic readers which function by scanning original documents in two dimensions. Typical of such solid state arrays are CCD (charge coupled device) and PDA (photodiode array) components. Such arrays comprise a large number of photosensitive elements, typically as many as 1728 elements, arranged in a line. The individual elements are sequentially electrically enabled or strobed in a predetermined direction for reading out electrical output signals corresponding to whether the corresponding portion of the original document has a density above or below a predetermined value.

These photosensor arrays are utilized in optoelectronic scanning readers by providing an optical system which focusses an image of a linear portion of an original document onto the array. The optical system is moved perpendicular to the linear portion of the document and thereby perpendicular to the array to effect vertical scan from top to bottom of the document. During the vertical scan, the photosensor elements of the array are enabled from left to right to effect horizontal scan. For each vertical scan, hundreds or thousands of horizontal scans must be performed to provide satisfactory image resolution. The electrical signals produced by the photosensor array are transmitted to a receiving device which reconstructs an image or hard copy of the document in response to the signals.

Although such scanning readers provide excellent performance, they suffer from a drawback regarding transmission speed where a single document must be scanned a number of times or a number of documents must be scanned rapidly in sequence. This is becsause the optical system must return to its original position prior to being moved for a subsequent vertical scan.

Where the return speed of the optical system is the same as the scan speed, the operating speed of the apparatus is unnecessarily reduced by a factor of two. Where provision is made to return the optical system at a speed which is significantly higher than the scan speed, the delicate components of the optical system are subjected to high rates of acceleration and deceleration which knock the optical system out of alignment in a relatively short period of time. If the document is scanned upwardly, or from bottom to top, the resulting reproduction will be a reversed, or mirror image of the original document.

SUMMARY OF THE INVENTION

The present invention overcomes the drawbacks of the prior art by alternatingly effecting vertical scan in the upward and downward directions and optically or electronically reversing the horizontal scan in accordance with the direction of vertical scan.

It is an object of the present invention to provide an optoelectronic scanning apparatus which operates at substantially increased speed compared to prior art apparatus.

It is another object of the present invention to eliminate a major cause of disalignment of an optical system in an optoelectronic scanning reader.

It is another object of the present invention to increase the service life and reduce the periodic maintenance requirements of an optoelectronic scanning reader.

It is another object of the present invention to provide a generally improved optoelectronic scanning apparatus.

BRIEF DESCRIPTION OF THE DRAWING

FIG. 6 is a diagrammatic view, in side elevation, of another optoelectronic scanning apparatus of the invention comprising a third embodiment of the reversal means;

FIG. 7 is an overhead plan view of the apparatus of FIG. 6;

FIG. 8 is a simplified overhead plan view of a first type of shutter means utilized in the apparatus of FIGS. 6 and 7;

FIG. 9 is similar to FIG. 8 but shows a second type of shutter means; and

FIG. 10 is a simplified side elevation of the shutter means of FIG. 9.

DESCRIPTION OF THE PREFERRED EMBODIMENTS

While the optoelectronic scanning apparatus of the invention is susceptible to numerous physical embodiments, depending upon the environments of use, substantial numbers of the herein shown and described embodiments have been made, tested and used, and all have performed in an eminently satisfactory manner.

Figure 1:
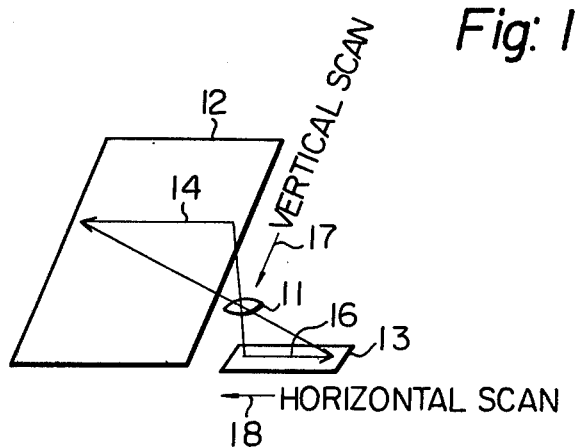
FIG. 1 is a perspective diagram illustrating the basic operation of an optoelectronic scanning apparatus of the present invention.

The basic scanning system of the present invention is illustrated in FIG. 1. An optical means which is shown in simplified form as a converging lens 11 is movably disposed between an original document 12 and a solid state photosensor array 13. The lens 11 focusses an image of a linear portion of the document 12, which is symbolized by an arrow 14, onto the array 13 as symbolized by an arrow 16. Vertical scan is effected by moving the lens 11 downwardly, relative to the document 12 and array 13, as indicated in the drawing by an arrow 17.

The array 13 comprises a large number, such as 1728, of individual photosensor elements which are fabricated by microelectronic techniques and are not illustrated. The photosensor elements are arranged in a line coincident with the arrow 16. The photosensor array 13 further comprises a scanning or strobe system (not shown) for sequentially enabling or strobing the photosensor elements from right to left as indicated by an arrow 18. When enabled, the photosensor elements produce electrical output signals indicating the density of the corresponding portion of the document 12. Typically, the output signals are binary indicating a density above or below a predetermined value. It will be noticed that leftward horizontal scan at the array 13 corresponds to rightward horizontal scan of the document 12 due to the image inversion produced by the lens 11. In summary, the document 12 is scanned from top to bottom (downwardly) and from left to right (rightwardly). The electronic horizontal scan is effected hundreds or thousands of times for each vertical scan, and always in the same direction (rightwardly on the document 12).

Although not shown, the electrical signals produced by the array 13 are transmitted to a receiver located at a remote location which reproduces the original document in response to the signals. The scanning direction of the receiver is the same as the reader, or downwardly and rightwardly.

FIGS. 2a to 2d illustrate the effect of scanning the document 12 in various directions, with the scan directions at the receiver remaining unchanged. The reference characters A and B indicate downward and upward vertical scan respectively. The reference characters C and D indicate rightward and leftward horizontal scan respectively. In each case, the horizontal scan is effected many times during each vertical scan.

Figures 2A, 2B, 2C, 2D:
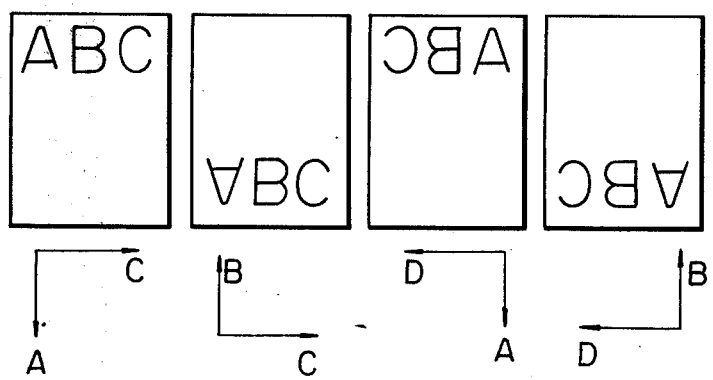
FIGS. 2a to 2d are diagrams illustrating the effects of scanning an original document in various directions.

FIG. 2a illustrates the case described above in which the vertical scan is downward and the horizontal scan is rightward. In FIG. 2b, the horizontal scan remains rightward but the vertical scan is upward. The reproduced copy appears as shown with the image not only inverted (upside-down) but reversed (mirror image). FIG. 2c shows the vertical scan as downward but the horizontal scan as leftward. Although the image is not inverted, it is reversed. FIG. 2d shows the effect of reversing both the vertical and horizontal scan, the vertical scan being upward and the horizontal scan being leftward. The image produced in accordance with FIG. 2d is identical to the image produced in accordance with FIG. 2a except that the image of FIG. 2d is inverted (upside-down). If copies were produced at the receiver in accordance with FIGS. 2a and 2d, and one or the other of the copies were simply turned upside-down, the two copies would appear identical.

This principle is utilized to advantage of the present invention whereby the document 12 may be scanned alternately upwardly and downwardly in the vertical direction by the lens 11. Where the vertical scan is downward, the horizontal scan is rightward as illustrated in FIG. 1. However, after a downward vertical scan is completed, the lens 11 is moved upwardly at the same speed thereby effecting another vertical scan. To prevent reversal of the image produced at the receiver, novel optical or electronic reversal means are provided to reverse the effective horizontal scan to leftward when the vertical scan is upward.

Figure 3:
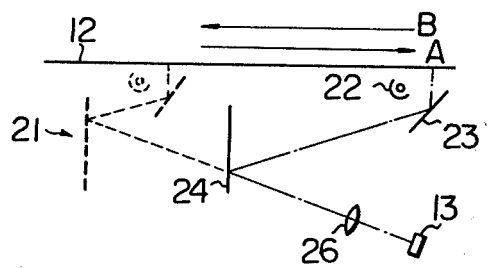
FIG. 3 is a simplified diagrammatic view of an optoelectronic scanning apparatus of the present invention.

Referring now to FIG. 3, the optical system is shown in greater detail and designated as 21. Like elements are designated by the same reference numerals used in FIG. 1. The optical system 21 is shown as comprising a light source 22 which illuminates the document 12 from below. The image of the document 12 is reflected from a plane mirror 23 to a plane mirror 24 from which it is reflected through a converging lens 26 onto the photosensor array 13. The light source 22 and mirror 23 move integrally between the solid and phantom line positions as illustrated for scanning the document 12 in the vertical direction. The mirror 24 moves in the same direction as the light source 22 and mirror 23 but at one-half the speed. This arrangement is especially advantageous for scanning bulky documents such as books since the document 12 is maintained stationary.

Figure 4:
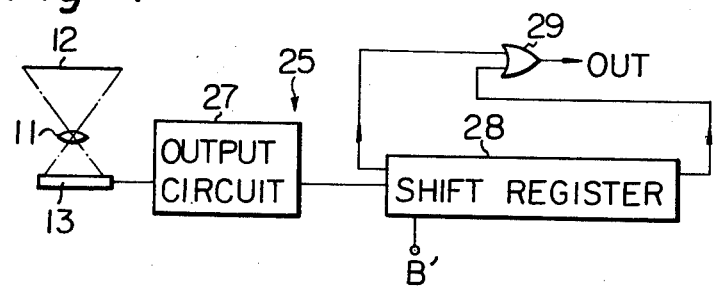
FIG. 4 is an electrical block diagram of a first embodiment of a reversal means of the present invention.

FIG. 4 illustrates a first embodiment of a reversal means embodying the present invention incorporated in an optoelectronic scanning apparatus 25. The output of the photosensor array 13 is connected through an output circuit 27 to the serial input of a bi-directional shift register 28. The left and right serial ouputs of the shift register 28 are connected to respective inputs of an OR gate 29. The output of the OR gate 29 constitutes the output of the apparatus 25. A direction select signal B' which when logically high indicates that the vertical scan direction is B, is applied to the shift direction select input of the shift register 28.

Each horizontal scan operation is performed in two stages. In the first stage, the document 12 is electronically scanned, always in the same direction since the array 13 does not have a bi-directional feature, and the output signals of the photosensor elements are fed serially into the shift register 28 in the rightward direction. During the second stage, the scan operation proper is interrupted and the electrical signals are serially fed out of the shift register 28 and transmitted to the receiver. When the vertical scan direction is A, the signal B' is logically low and the shift register 28 feeds out the signals in the rightward direction, or the same direction as the signals were fed in. However, when the scan direction is B, the corresponding signal B' is logically high and the shift direction is changed to leftward. In other words, the signals are shifted out of the shift register 28 in a direction opposite to the direction they were shifted in. This constitutes electronic reversal of the horizontal scan direction to leftward when the vertical scan direction is upward. It will be noted that the direction select signal B' is only applied to the shift register 28 during the second stage of the scan operation.

Figure 5:
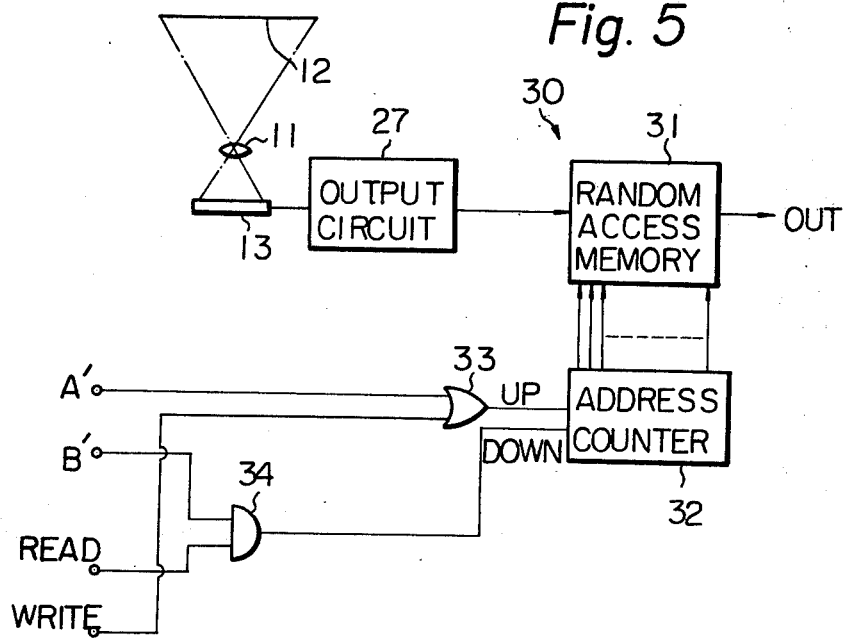
FIG. 5 is similar to FIG. 4 but shows a second embodiment of the reversal means.

FIG. 5 illustrates another optoelectronic scanning apparatus 30 in which the reversal means comprises a random access memory 31, the memory locations of which are selected by means of a bi-directional address counter 32. A signal A' indicating that the vertical scan direction is A and a WRITE signal indicating that data is to be written into the memory 31 are applied to inputs of an OR gate 33, the output of which is connected to a count-up select input of the address counter 32. The signal B' and a READ signal indicating that data is to be read out of the memory 31 are applied to inputs of an AND gate 34, the output of which is connected to a count-down select input of the address counter 32.

During the horizontal scan operation proper, the WRITE signal is high and the READ signal is low so that the OR gate 33 and AND gate 34 produce high and low outputs respectively, thereby controlling the address counter 32 to count up. The output signals from the photosensor elements of the photosensor array 13 are thereby stored in the memory 31 in consecutively higher memory locations.

During the portion of the horizontal scan operation in which the horizontal scan proper is interrupted and the signals are transmitted to the receiver, the WRITE signal is low and the READ signal is high. If the A' signal is high and the B' signal is low indicating downward vertical scan, the OR gate 33 and AND gate 34 produce high and low outputs respectively as during the scan operation proper. Thus, the address counter 32 counts up and the signals are read out of the memory 31 in the same sequence in which they were read in. However, when the signal A' is low and the signal B' is high indicating upward vertical scan, the OR gate 33 and AND gate 34 produce low and high outputs respectively, and the address counter 32 is controlled to count down. This causes the signals to be read out of the memory 31 for transmission from the higher to lower memory locations, or in the opposite direction or sequence from which they were read in. This causes electronic reversal of the horizontal scan direction.

FIGS. 6 and 7 illustrate another optoelectronic scanning apparatus 41 comprising a third embodiment of a reversal means. The apparatus 41 comprises a lamp 42 for illuninating an original document 43 such as a book and mirrors 44 and 46 which are movable between solid and phantom line positions as shown for vertical scan in the same manner described above. The apparatus 41 further comprises a first imaging system (not desngnated) including a converging lens 47 and a plane mirror 48 disposed to the left of the array 13 as viewed in FIG. 7. A second imaging system (not designated) comprises a converging lens 49 and a plane mirror 51 which are disposed to the right of the array 13. A shutter 52 is disposed in front of the lenses 47 and 49 to selectively unblock the imaging systems.

As can be understood from examination of FIG. 7, the lenses 47 and 49 would produce inverted images as indicated by arrows 53 and 54 respectively of an object indicated by an arrow 56 if the mirrors 48 and 51 were removed. However, the mirrors 48 and 51 reflect images onto the array 13 in opposite directions which are inverted with respect to each other as indicated by arrows 57 and 58.

In operation, the shutter 52 is actuated to unblock the lens 47 and block the lens 49 when the vertical scan direction is downward, thus producing the erect image 57 on the array 13. When the vertical scan direction is changed to upward, the shutter 52 blocks the lens 47 and unblocks the lens 49, thus producing the inverted image 58 on the array 13. This optical inversion of the image produces reversal of the horizontal scan direction since the elements of the array 13 are always enabled or stobed in the same direction. It will be noted that the embodiment of FIGS. 6 and 7 can operate at even higher speed than the embodiments of FIGS. 4 and 5 since the output signals of the array 13 can be transmitted as soon as they are produced.

The shutter 52 can be embodied in a number of different ways. In FIG. 8, the shutter 52 is shown as comprising two identical leaf shutters 52a and 52b, the shutter 52a being shown as closed and the shutter 52b being shown as open.

FIGS. 9 and 10 illustrate another shutter which is designates as 52' and is formed as an opaque circular plate. The shutter 52' is moved between solid and phantom line positions as indicated to unblock one or the other of the lenses 47 and 49.

In summary, it will be seen that the present invention significantly increases the operational speed of an optoelectronic scanning apparatus comprising a photosensor array and a movable optical system for producing horizontal and vertical scan respectively thereby reading an original document. The speed of movement of the optical system is maintained low, thereby reducing the acceleration and deceleration forces on the optical system and reducing the possibility of the optical system being knocked out of alignment. This reduces the periodic maintenance requirements of the apparatus.

Various modifications will become possible for those skilled in the art after receiving the teachings of the present disclosure without departing from the scope thereof. For example, the optical system shown may be replaced with an optical system comprising a rotating rather than a translating mirror arrangement. It is also possible to effect horizontal scan reversal at the receiver and furthermore to provide single or double image reversal if desired.

What is claimed is:

1. An optoelectronic scanning apparatus comprising:
    a photosensor array means including a plurality of linearly spaced photosensor elements and means for sequentially enabling the photosensor elements in a first direction;
    optical means for scanning an original document in a second direction which is perpendicular to the first direction and focussing a light image of a linear portion of the document on the photosensor array means;
    the optical means being further operative to scan the document in a third direction which is opposite to the second direction; and
    reversal means operatively connected to the optical means and photosensor array means for controlling the photosensor array means to produce electrical output signals corresponding to scanning the document in a fourth direction which is perpendicular to the second direction when the optical means is scanning the document in the third direction and produce electrical output signals corresponding to scanning the document in a fifth direction which is opposite to the fourth direction when the optical means is scanning the document in the third direction.

2. An apparatus as in claim 1 in which the optical means is constructed to selectively focus an erect image and an inverted image on the photosensor array means.

3. An apparatus as in claim 2 in which the optical means comprises first and second imaging means each including a converging element and a mirror for forming the erect and inverted images on the photosensor array means respectively, the reversal means comprising shutter means for selectively blocking the first and second imaging means.

4. An apparatus as in claim 1 in which the photosensor array means comprises a bi-directional shift register for storing output signals of the photosensor elements, the reversal means being connected to control the shift register to serially feed out the output signals in sixth and seventh mutually opposite directions thereby producing the electrical output signals when the optical means is scanning the document in the second and third directions respectively.

5. An apparatus as in claim 1 in which the photosensor array means comprises a random access memory for storing output signals of the photosensor elements, the reversal means comprising a bi-directional address counter for sequentially selecting addresses in the random access memory for reading out the output signals, the reversal means further comprising means connected to control the address counter to serially select addresses in eighth and ninth mutually opposite directions thereby producing the electrical output signals when the optical means is scanning the document in the second and third directions respectively.

* * * * *